United States Patent Office 3,408,335
Patented Oct. 29, 1968

3,408,335
ANIONIC POLYMERIZATION OF LACTAMS WITH UNSATURATED LACTONE AS PROMOTER
Johannes van Mourik, Geleen, and Johannes van Beveren, Sittard, Netherlands, assignors to Stamicarbon N.V., Heerlen, Netherlands
No Drawing. Filed June 10, 1965, Ser. No. 463,010
Claims priority, application Netherlands, June 13, 1964, 6406750
14 Claims. (Cl. 260—78)

ABSTRACT OF THE DISCLOSURE

In the process wherein a lactam is subjected to anionic catalytic polymerization in the presence of a catalyst and a promoter, the improvement consisting in using an unsaturated lactone as said promoter wherein said unsaturated lactone is selected from the class consisting of tricyclo-(9.3.0.0$^{2.8}$) 3.10-dioxa-4.9-dioxo-tetradecadiene-1–11.2–8 and 1.2-benzopyrone.

---

The present invention relates to the ionogenic or anionic polymerization of lactams, and an improved process therefor.

It is common knowledge that the ionogenic or anionic polymerization of lactams, which is usually carried out with an alkalimetal compound as a catalyst, may be considerably accelerated by also adding a promoter to the reaction system. Promoters that may be used for this purpose are frequently nitrogen compounds, such as isocyanates, carbodiimides, cyanamides, and, in general compounds with a tertiary nitrogen atom bound to carbonyl, thiocarbonyl, sulphonyl, or nitroso groups. As the result of the addition of these promoters, the polymerization reaction can be carried out in a comparatively short period of time at temperatures that are lower than the melting point of the polymer. In this manner, using starting material lactams, the molecule of which contains at least 6 carbon atoms in its ring, a solid polymeric product can be obtained conforming to or having the shape of the reaction vessel in which the polymerization has been carried out.

It is an object of this invention to provide an improvement to the aforesaid process and specifically a process using an improved promoter.

It has now been discovered according to this invention that especially good results are obtained in the aforesaid ionogenic or anionic catalytic polymerization of a lactam or a mixture of lactams by employing an unsaturated lactone as the promoter.

As examples of suitable lactones to be used in the invention, there may be mentioned the readily accessible representatives of the unsaturated lactones: [tricyclo-9.3.0$^{2.8}$] 3,10 - dioxa - 4.9-dioxo-tetradecadiene-1–11.2–8 and 1.2-benzopyrone (coumarin).

In the ionogenic or anionic catalytic polymerization of lactams according to this invention, the aforesaid lactone promoter is used in combination with a catalyst. Well-known catalysts suitable for use in this polymerization are, for instance: lactam-metal compounds containing a metal atom bound to the nitrogen atom, such as sodium caprolactam, and substances from which such lactam-metal compounds may be formed by reaction in situ with the lactam, for instance, triisopropyl aluminum, diethyl zinc, and alkali-metal alkyls. In addition, alkali metals, alkali-earth metals, and compounds of these metals showing an alkaline reaction, such as hydrides, oxides, hydroxides, and carbonates, and also Grignard compounds, such as alkyl magnesium bromide and aryl magnesium bromide may be similarly so used to form the lactam-metal compound. The amount of catalyst used may be varied within wide limits. Usually use is made of 0.1–3 mol. percent with respect to the amount of monomer to be polymerized, but larger amounts, e.g., 5–10 mol. percent may also be used.

Also the amount of lactone promoter to be used may be varied. When large amounts, e.g., more than 10 mol. percent are used, a lower degree of polymerization is obtained than when small amounts are used. Usually use is made of 0.05–2 mol. percent of lactone promoter with respect to the lactam.

When the process according to this invention is carried out, the lactam can be mixed with the catalyst and the promoter in any simple way. By preference, the lactam is melted, the catalyst is distributed into the melt, and the mixture is heated to the polymerization temperature, after which the promoter is added.

The temperature at which the polymerization is carried out may be in the range of 90–250° C. as is commonly used for the ionogenic or anionic polymerization of lactams. Use is preferably made of an initial temperature of 90–150° C., while, due to the exothermic nature of polymerization reaction, the temperature may rise autogenously during the reaction, but will usually remain below 200–215° C. At these temperatures, the polymerization is generally completed within half an hour, often within a quarter of an hour.

If use is made of a temperature lying between the melting point of the lactam monomer and the melting point of the polymer found in the process, the solid macromolecular end product of the polymerization is obtained as an object according to the dimensions of the reaction vessel in which the polymerization was carried out.

The polymerization may be carried out with various omega lactams, such as butyrolactam, caprolactam, oenantholactam, caprylolactam, decyllactam, undecyllactam and laurinolactam and mixtures of two, three, or more lactams may also be polymerized. If mixtures are polymerized, copolyamides are obtained, e.g., oenantho-lactam-caprolactam-laurinolactam copolyamide, laurino lactam - oenantholactam copolyamide, undecyllactam-caprolactam copolyamide, caprolactam - caprylolactam-laurinolactam copolyamide, laurinolactam-caprolactam copolyamide, butyrolactam-caprolactam copolyamide. The structure and the properties of the copolyamides can be influenced by the composition of the starting mixture of monomers.

The process according to the invention may furthermore be used for the manufacture of special products. To this end, one or more substances which influence the outward appearance and/or the properties of the polymerization product can be mixed with the starting material in a simple way. For instance, dyestuffs and/or all kinds of fillers, such as wood flour, carborundum, carbon black, powdered shale, coal dust, and coke dust, may be distributed in the lactam melt. Natural and/or synthetic fibers, threads and/or fabrics made thereof may also be processed into the lactam melt. Furthermore, macromolecular products, e.g. polystyrene, polyformaldehyde, polypropylene, polyethylene, and polyamide, and also polycondensation products of aldehydes with phenol, melamine and/or urea may be added to the lactam melt, so that macromolecular products with special properties can be obtained.

Furthermore, to obtain products with a cellular structure, blowing agents, e.g. hydrocarbons, which produce vapors at the polymerization temperature, may be mixed with the starting material.

EXAMPLE 1

The polymerization reaction is carried out within a glass cylinder (diameter 2.5 c.m.), whereby a bar of the polymer is made. The glass cylinder is placed in an oil bath maintained at a temperature of 150° C.

A molten mixture of 30 grams of ε-caprolactam and 0.6 gram of sodium-caprolactam is placed within the glass cylinder, while a flow of nitrogen is passed through the liquid reaction mixture by means of an inlet tube. Subsequently, 0.3 mol. percent of tricyclo-[9.3.0.0$^{2.8}$]3.10-dioxa-4.9-dioxo-tetradecadiene-1–11.2–8 is added as promoter and after 30 seconds the flow of nitrogen is stopped and the inlet tube removed. After 9 minutes, the shaped bar of polymer may be taken from the glass cylinder.

By way of comparison, the above polymerization reaction is repeated with the sole difference that the saturated ε-caprolactone (0.3 mol percent) is used as promoter. In this case, the shaped bar cannot be taken from the glass cylinder until after 53 minutes.

EXAMPLE 2

The polymerization described in Example 1 is repeated with the sole difference that 0.3 mol. percent of 1.2-benzopyrone is used as promoter. The shaped bar polymer could be taken from the glass cylinder after 22 minutes.

What is claimed is:

1. In the process wherein a lactam is subjected to anionic catalytic polymerization in the presence of a catalyst and a promoter, the improvement consisting in using an unsaturated lactone as said promoter wherein said unsaturated lactone is selected from the class consisting of tricyclo - [9.3.0.0$^{2.8}$]3.10 - dioxa - 4.9-dioxo-tetradecadiene-1–11.2–8 and 1.2-benzopyrone.

2. The process according to claim 1, wherein the polymerization is carried out at temperatures lying between the melting point of said lactam and that of the polymerization product.

3. The process of claim 1 wherein a mixture of lactams are employed.

4. The process of claim 1 wherein said catalyst is an alkali metal compound.

5. The process of claim 4 wherein said alkali-metal compound in the reaction mixture is an alkali-metal lactam.

6. The process of claim 1 wherein said unsaturated lactone is tricyclo-[9.3.0.0$^{2.8}$]3.10-dioxa-4.9 - dioxo-tetradecadiene-1–11.2–8.

7. The process of claim 1 wherein said unsaturated lactone is 1.2-benzopyrone.

8. The process of claim 1 wherein the amount of said lactone is within the range of 0.5 to 10 mol. percent based on the amount of lactam.

9. The process of claim 8 wherein the amount of said lactone is at most 2 mol. percent.

10. The process of claim 1 wherein the temperature is within the range of 90 to 250° C.

11. The process of claim 1 wherein said lactam is an omega-lactam.

12. The process of claim 1 wherein said lactam has from 4 to 12 carbon atoms in the lactam ring.

13. The process of claim 1 wherein said lactam is selected from the class consisting of butyrolactam, caprolactam, oenantholactam, caprylolactam, decyllactam, undecyllactam and laurinolactam.

14. The process of claim 1 wherein said lactam is caprolactam.

References Cited

UNITED STATES PATENTS 2,809,958　10/1957　Barnes et al. _____ 260—78
3,214,415　10/1965　Giberson _____ 260—78

WILLIAM H. SHORT, *Primary Examiner.*

H. D. ANDERSON, *Examiner.*